United States Patent
Kissner et al.

(10) Patent No.: US 7,143,068 B2
(45) Date of Patent: Nov. 28, 2006

(54) REMOTE POSTAGE METER RESETTING SYSTEM HAVING REBATE GENERATING CAPABILITIES

(75) Inventors: Matthew S. Kissner, Scarsdale, NY (US); Kevin S. Weiss, Wilton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1150 days.

(21) Appl. No.: 09/729,394

(22) Filed: Dec. 4, 2000

(65) Prior Publication Data

US 2002/0069185 A1    Jun. 6, 2002

(51) Int. Cl.
*G06Q 50/00* (2006.01)
(52) U.S. Cl. .................................................. 705/61
(58) Field of Classification Search ............ 705/60–62, 705/401–403, 14
See application file for complete search history.

(56) References Cited

U.S. PATENT DOCUMENTS

| | | | |
|---|---|---|---|
| 4,097,923 A | 6/1978 | Eckert, Jr. et al. | |
| 4,376,299 A | 3/1983 | Rivest | |
| 4,447,890 A | 5/1984 | Duwel et al. | |
| 5,537,314 A * | 7/1996 | Kanter | 705/14 |
| 5,729,693 A | 3/1998 | Holda-Fleck | |
| 5,907,830 A * | 5/1999 | Engel et al. | 705/14 |
| 5,909,373 A | 6/1999 | Sansone et al. | |
| 6,018,718 A * | 1/2000 | Walker et al. | 705/14 |
| 2001/0043516 A1 | 11/2001 | Gelfer et al. | |

FOREIGN PATENT DOCUMENTS

EP    1 067 438 A2    1/2001

\* cited by examiner

*Primary Examiner*—James P. Trammell
(74) *Attorney, Agent, or Firm*—Steven J. Shapiro; George M. Macdonald; Angelo N. Chaclas

(57) ABSTRACT

A data center for a postage meter resetting system includes a computer that receives a postage refill request to electronically add a postage refill amount to a postage meter; structure for determining at the computer a rebate value associated with the postage refill request; and apparatus for sending the rebate value to a designated location.

17 Claims, 5 Drawing Sheets

REMOTE POSTAGE METER RESETTING SYSTEM HAVING REBATE GENERATING CAPABILITIES

FIELD OF THE INVENTION

The instant invention relates to remote postage meter resetting systems, and more particularly to remote postage meter resetting systems having rebate generating capabilities.

BACKGROUND OF THE INVENTION

Postage meters are devices for dispensing value in the form of postage printed on a mailpiece such as an envelope. The term postage meter also includes other similar meters that dispense an indication of value such as parcel post meters and tax stamp machines. Postage meters of this type print and account for postage (value) stored within the meter.

Since the above-mentioned postage meters have a finite amount of postage value (to be dispensed) stored therein, they will eventually run out of stored postage value such that the postage meter is disabled from printing postage until additional postage value is added to the postage meter. Remote meter resetting systems have been developed which provide the capability of having postage added to these postage meters without requiring the postage meter to be physically brought into the post office. Examples of such conventional remote postage meter resetting systems are shown, for example, in U.S. Pat. Nos. 4,447,890 and 4,097,923, each of which are incorporated herein by reference.

While the aforementioned remote postage meter resetting systems work very well, increased use of these postage meters is desired by postal authorities because the postage value within the meter is paid for in advance of its dispensing. Additionally, increased use of postage meters reduces the need for stamps and the costs associated with such stamps that relate to their printing, storage, distribution, and sale. Furthermore, the counterfeiting of stamps and the reuse of stamps that have been "washed" to remove a postage cancellation mark present other reasons as to why metered mail is preferable to stamped mail.

The increased use of postage meters that are capable of printing/producing a postage indicium including a self-verifying cryptographic code would save the postal service a great deal of the money which is now spent to produce and distribute stamps or which is lost due to the use of fraudulent stamps. Accordingly, what is needed is a postage metering system that rewards users based on the amount of use of the system thereby encouraging the use of the postage metering system instead of stamps.

SUMMARY OF THE INVENTION

The instant invention is directed to a data center for a postage meter resetting system includes a computer that receives a postage refill request to electronically add a postage refill amount to a postage meter; structure for determining at the computer a rebate value associated with the postage refill request; and apparatus for sending the rebate value to a designated location.

The instant invention is also directed to a method for generating a rebate in a postage meter resetting system, the method including receiving a postage refill request at a postage data center to electronically add postage to a postage meter; determining at the postage data center a rebate value associated with the postage refill request; and sending the rebate value to a designated location.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. Furthermore, like reference numerals are used to describe similar components in the various Figures.

DETAILED DESCRIPTION OF THE PREFERRED EMBODIMENTS

Figure 1:
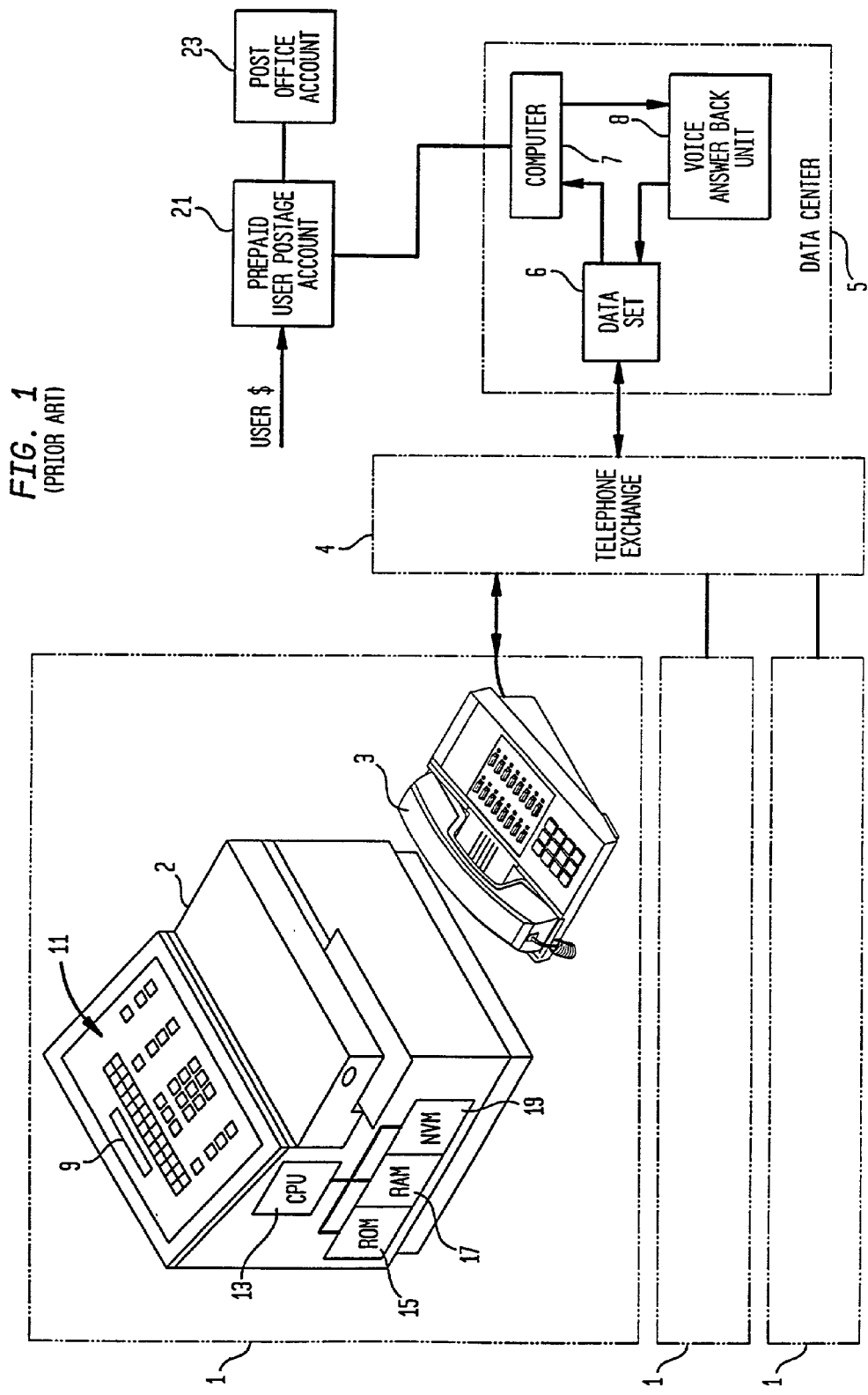
FIG. 1 is a schematic block diagram of a first prior art postage meter resetting system.

Referring to FIG. 1, a schematic block diagram of a conventional remote postage meter resetting system is shown. A plurality of blocks 1 represent remote postage meter stations capable of communicating with a data center 5. The remote postage meter stations 1 communicate with data center 5 via telephone exchange equipment generally indicated at 4. The transmitter-receiver at each remote station 1 is a conventional tone signaling telephone 3. Telephone 3 is used to establish two way communications between postage meter station 1 and data center 5.

Data center 5 includes a data set 6 of known construction which receives frequency encoded data input from telephone 3 of any of the remote postage meters stations 1 and transforms this input into a suitable machine language for use by a computer 7 of data center 5. Computer 7, in turn, controls in a conventional manner a known voice-answer back unit 8. Voice answer back unit 8 formulates voice responses for transmission back to the particular postage meter station 1, via the telephone exchange 4.

Each remote postage meter station 1 includes a known electronic postage meter 2. Postage meter 2 includes a display 9, a keyboard 11, a central processing unit 13 (or a plurality of CPU's operating together), a ROM 15, a RAM 17, and nonvolatile memory 19. The CPU 13 controls operation of the meter 2 including the keyboard 11 and display 9 so that information can be input by the user to the postage meter 2 via the keyboard 11 and displayed in display 9. Similarly, display 9 displays information or prompts from postage meter 2 to solicit input from or to communicate information to the postage meter user.

ROM 15 has stored therein the operating programs of the postage meter 2 which are executed by CPU 13, while RAM 17 acts as a temporary working memory utilized during program execution. NVM 19 typically has stored therein the postage accounting register of the meter which conventionally include: an ascending register which is indicative of the lifetime total amount of postage printed by the postage meter 2, a descending register which is indicative of the amount of available postage remaining in the postage meter, and a control sum register which represents the sum of the ascending and descending registers. Each of the aforementioned accounting register are changed, as required, when postage is dispensed from or added to the postage meter under the control of the CPU 13 operating in accordance with programming stored in ROM 15.

Postage is remotely funded into postage meter 2 by first telephoning data center 5 via telephone 3. The postage meter user provides the data center 5 with the meter serial number, the last readings of the ascending and descending registers, a user account number, and the amount of postage that is desired to be added to the postage meter 2. Computer 7 verifies the authenticity of the call in a known manner and communicates with a prepaid user postage account data base 21 to determine if the specified user account has enough prepaid funds therein to cover the amount of postage which is desired to be added to the postage meter 2. If sufficient funding exists in the user account, the user accounted is debited by the requested postage amount and a computer associated with data base 21 sends funds equivalent to the postage amount to be added to the postage meter 2 to a specified Post Office account 23. Computer 7 then formulates a resetting combination which is at least partially based on the meter serial number and the requested postage amount. This combination is transmitted to the user via the voice answer back unit 8, data set 6, telephone exchange 4, and telephone 3. Having received the combination code, the user unlocks the meter, keys in the desired postage to be added via the keyboard 11, and enters the combination. The meter 2 contains a program in ROM 15 that utilizes the entered desired postage amount and generates an internal combination based on that amount. If the internally generated combination and the entered combination are the same, the accounting registers are appropriately changed by CPU 13 thereby adding the desired postage to postage meter 2.

In the event that computer 7 determines that there is insufficient postage in the user account to cover the desired postage increase to postage meter 2, a response is received via telephone 3 advising that such is the case and terminating the transaction.

Figure 2:
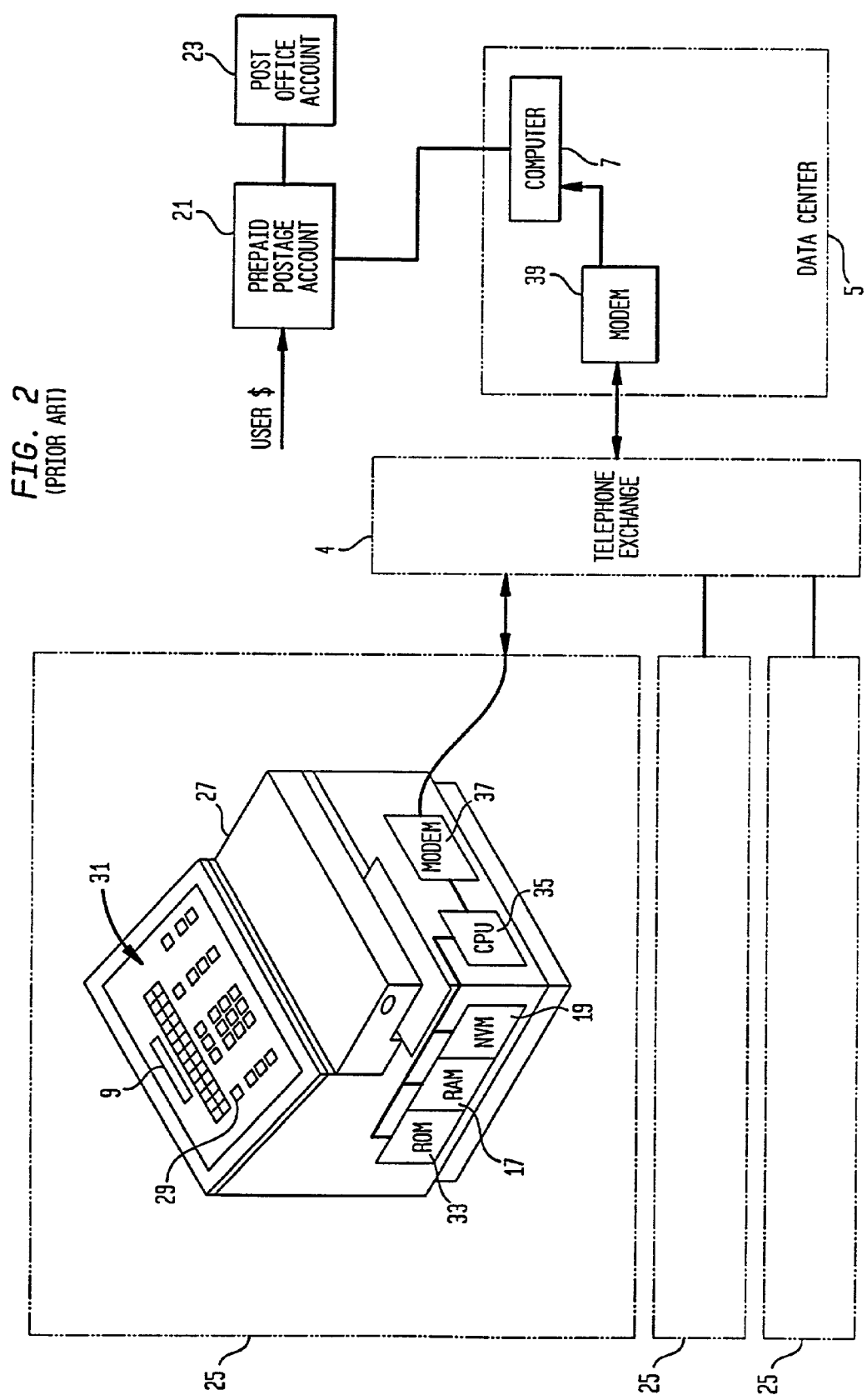
FIG. 2 is a schematic block diagram of a second prior art postage meter resetting system.

FIG. 2 shows a second conventional postage meter resetting system which is very similar to the system of FIG. 1 except that it is more fully automated requiring the user to only establish communication with the data center 5 via the remote postage meter station 25 and to provide the data center 5 with the desired postage amount to be added to postage meter 27. The remaining download of the combination from the data center 5 to meter 27, the internal generation of the combination by the meter 27, the comparison of the combinations, and the subsequent addition of postage by changing accounting register values are automatically accomplished under the control of CPU 35.

In operation, the user presses a designated button 29 of keyboard 31, which button 29 indicates that a remote postage refill is desired. Programming in ROM 33 causes CPU 35 to prompt the user via display 9 to enter, via keyboard 31, the amount of postage desired. Once the user responds, CPU 35 activates a modem 37 which automatically dials data center 5 and establishes communication therewith via a modem 39 at data center 5. CPU 35, via modems 37, 39 and telephone exchange 4 automatically provides the necessary register readings, the meter serial number, the pre-stored user account number, and the amount of postage desired to computer 7. Computer 7 then authenticates the call and communicates with prepaid postage account 21 to determine whether or not sufficient funds exist in the specified user account to cover the desired postage to be added to postage meter 27. If sufficient funds are available, debiting of the user account and the sending of postage funds to the post office account 23 are accomplished as previously discussed in connection with FIG. 1. However, in the system of FIG. 2, the combination code generated by computer 7 is sent directly to the CPU 35 from computer 7 via modems 39,37 and telephone exchange 4. CPU 35 then generates a combination code as previously discussed in connection with CPU 13 of FIG. 1, compares the generated code to the received code, and adds postage to the meter by changing the accounting registers if the codes match. Thus, the system of FIG. 2 requires less user input to accomplish the adding of postage to postage meter 27.

Figure 3:
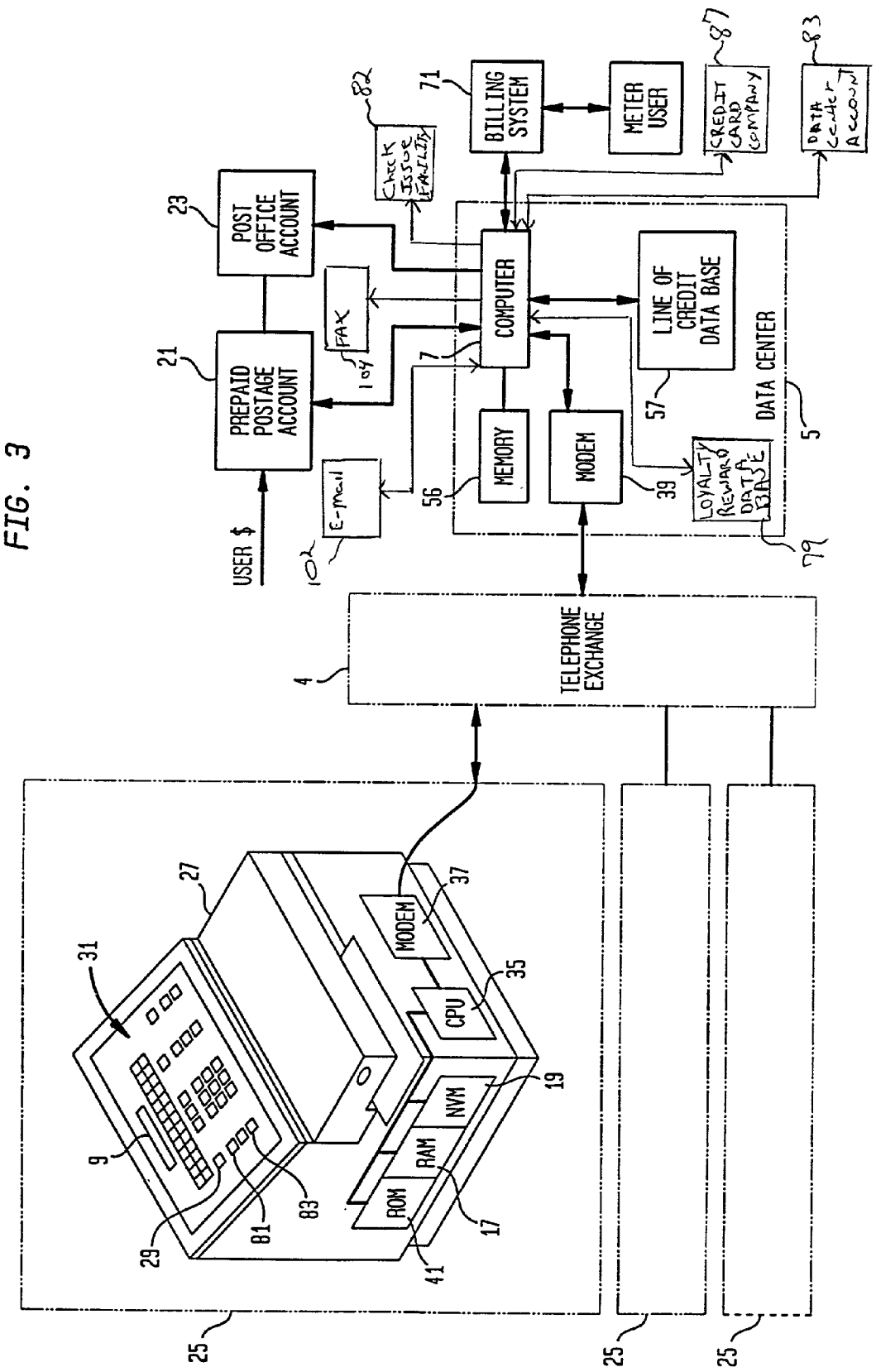
FIG. 3 is a schematic block diagram of a first embodiment of the inventive postage meter resetting system having rebate generating capabilities.
Figure 4A:
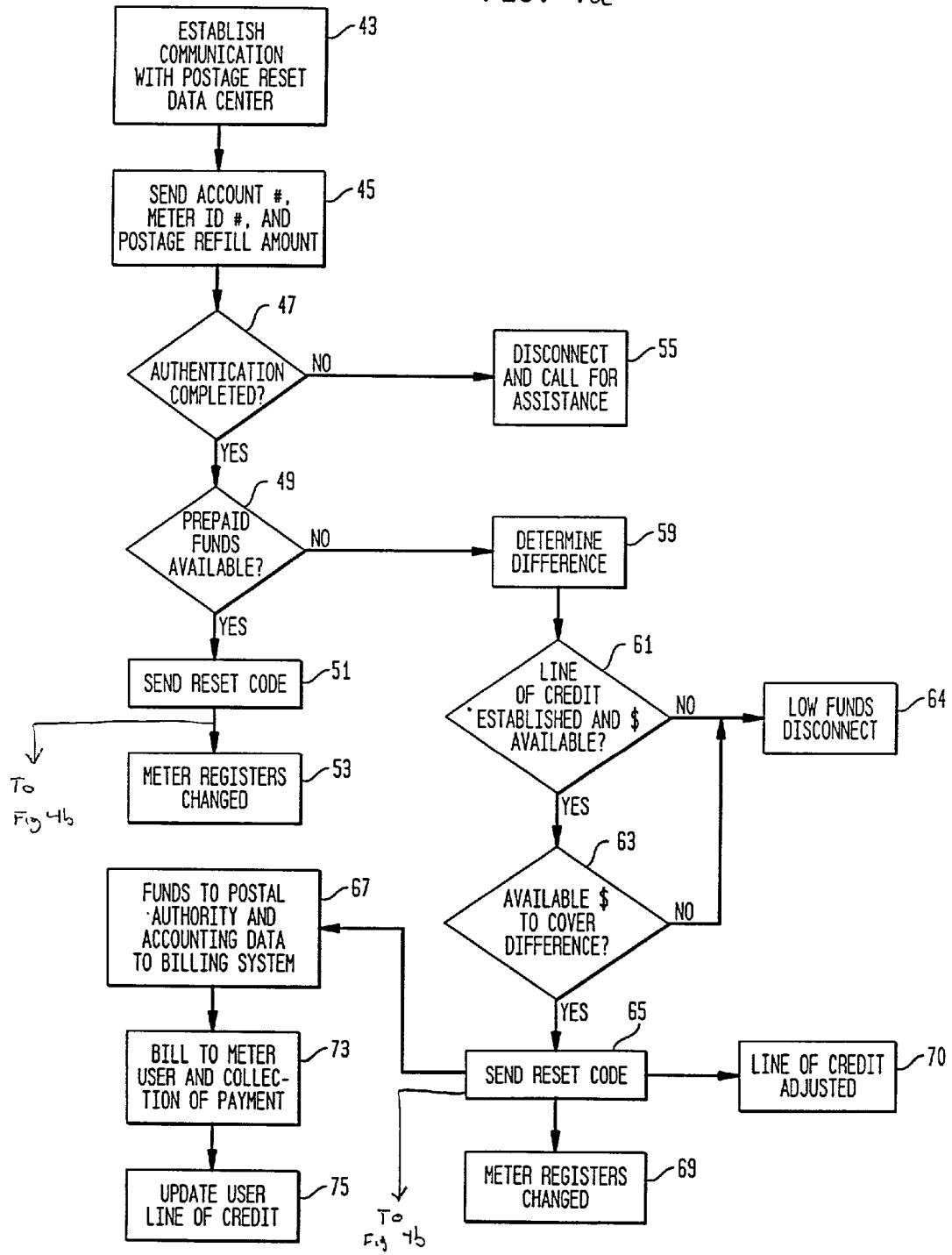
FIGS. 4a and 4b collectively show a flowchart detailing the operation of the system of FIG. 3.
Figure 4B:
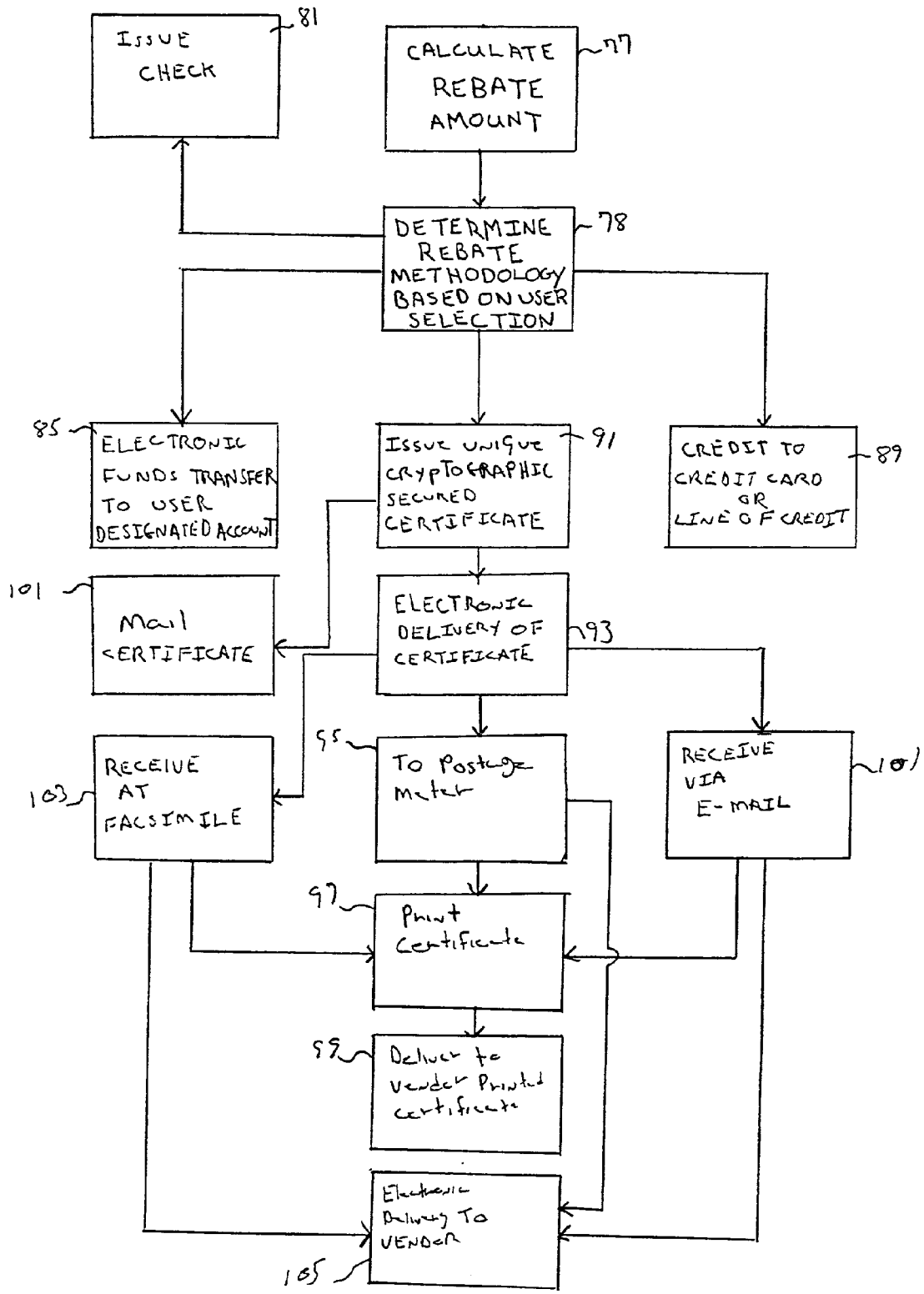

Referring to FIGS. 3, 4a, and 4b, an improved postage metering resetting system is described hereinbelow. However, in order to be concise and not repeat previously described details, the operation and structure of postage meter 27 is essentially the same as that of FIG. 2 except for specific features to be described later which are effectuated by programming stored in ROM 41. Thus, with particular reference to FIGS. 4a and 4b, when a request for a postage refill is initiated by pressing key 29, the establishment of communication with the data center (step 43), the sending of account number/meter serial number/refill amount from the meter 27 to data center 5 (step 45), the authentication of the call by data center 5 (step 47), and the determination by computer 7 via communication with prepaid postage account data center 21 as to whether sufficient funds are available in the user account to cover the requested postage (step 49) are all accomplished as discussed in connection with the system of FIG. 2. Moreover, if sufficient funds are available, the processes and structure for accomplishing debiting of the user account, payment to the post office account 23 of the debited amount, generation and comparison of combination codes (step 51) and resetting of the accounting registers in postage meter 27 (step 53) are all accomplished as described in FIG. 2. Additionally and as described for the system of FIG. 2, if the authentication of step 47 is not successfully completed, at step 55 the user is advised via display 9 to call for assistance and the reset transaction is terminated.

In the event however that at step 49 it is determined that the user account has insufficient funds to cover the requested postage to be added to postage meter 27, computer 7 determines the difference between the postage requested and the amount in the user account (step 59). Then, the system of FIG. 3 utilizes a program stored in a memory 56 which directs computer 7 to access a line of credit data base 57 which is resident at the data center 5. The line of credit database 57 has stored therein a predetermined line of credit for each user who has been pre-approved for such a line of credit. The line of credit associated with each pre-approved user account number has a predetermined limit which can vary for each user Thus, when computer 7 queries the line of credit data base 57 it determines if a line of credit has been established for that user (identified for example by the user account number) (step 61). If a line of credit has not been established, computer 7 sends a message to the user that is displayed on display 9 indicating that sufficient funds are not available and terminating the refill transaction (step 63). If however, at step 61, it is determined that a line of credit has been established for the user, computer 7 determines how much money is currently available in the line of credit and whether such amount is sufficient enough to cover the difference between the requested postage addition and the funds available in the prepaid user account (step 63). If the answer to the inquiry at step 63 is yes, computer 7 calculates and sends the reset code (combination code) to CPU 35 in the same manner as discussed in connection with FIG. 2 (step 65), effectuates the transfer of funds equal to the calculated difference from a funding source of the data center owner to the post office account 23 to pay for the postage associated with the calculated difference and sends information concerning the credit extended to the user to a billing data center 71 (step 67), and adjusts the line of credit available to the user in the data base 57 to account for the calculated difference paid by the data center owner on behalf of the user (step 70). The billing center 71 then bills the user for the credit extended, receives payment from the user for such credit (73), and upon receipt of payment communicates with computer 7 to permit computer 7 to update the available user credit line taking into account the payment received (step 75). As previously discussed, CPU 35 utilizes the reset code received from Computer 7 to change the meter registers to reflect the addition of the desired postage funds (step 69).

Returning to either of steps 51 and 65, once the reset code has been sent, computer 7 calculates a rebate amount which is due to the licensed meter user based on the refilling of postage meter 27 with additional funds (step 77). Typically, the rebate amount will be based on the actual amount of postage added to the postage meter 27 (refill amount). For example, the rebate amount may be any fixed percentage of the refill amount or a specific value associated with defined refill amount ranges. However, it is to be understood that that the instant invention contemplates using any method of computing or determining a rebate amount whether it is based on the refill amount, the number of refills, or other data associated with postage meter refill activity such as frequency and timeframes.

Upon generation of the rebate amount, the computer 7 initiates the process of providing the rebate to the postage meter 27 user via one of a plurality of methods. The specific manner in which computer 7 determines the which rebate return method to use is accomplished in one of two ways. Either postage meter 27 is provided with the functionality to permit the user to select (via keyboard 31) a desired rebate return method together with the refill request, or the postage meter user pre-selected the desired rebate return method when the postage meter 27 was initially licensed (step 78). In any event, data center 5 includes a loyalty revenue data base 79 which identifies for each licensed postage meter 27 all address, account, and other data that is needed by computer 7 to effectuate any selected rebate return method. Additionally, if a particular rebate return method was pre-selected as a default mode, the loyalty reward data base 79 has that information stored as well for access by computer 7.

A first process for sending a rebate is through issuance of a check as shown at step 81. The check can be processed and mailed using facilities at the data center 5 or at a remote location 82 based on a data input from computer 7.

A second rebate method is to initiate communication between computer 7 and a data center funds account 83 so that a funds transfer in the rebate amount is effectuated between the data center account 83 and any designated account of the licensee of the postage meter 27, such as for example, the prepaid postage account 21 (step 85).

Yet another manner in which the rebate can be processed is to provide the rebate value as a credit that appears at the line of credit established for the licensee of the postage meter 27 in the line of credit data base 57 or which is posted as a credit at a specified credit card company 87 (step 89).

While the above rebate processes are each directed to the transfer of or accounting for funds, the instant invention also contemplates other forms of providing rebate value to the postage meter licensee in response to a postage refill action. For example, a certificate can be issued that is redeemable for goods and/or services (or discounts relative thereto). The certificate can be sent electronically (step 93) to the postage meter 27 (step 95) along with the refill combination and stored in NVM 19 for subsequent use. That is, the postage meter 27 can use its associated printer (not shown) to print the certificate (step 97) for subsequent delivery to the vendor associated with the certificate (step 99).

Alternatively, based on the desire of the postage meter licensee, the computer 7 can send, via the modem 39 or any conventional communications channel, the electronic certificate to a designated e-mail address (step 101) at a host system 102 or a facsimile machine 104 (step 103). At either the fax machine or the device at which the e-mail is received, the certificate can be printed in a conventional manner (step 97) and submitted to the appropriate vendor (step 99). It is important to note that the processing of the certificate electronically, as described above, can be based on pre-selected criteria or can be effectuated real time via the postage meter keyboard 31.

As an alternative, the certificate that is received at the postage meter, as e-mail, or at a facsimile machine could also be submitted electronically directly to the vendor (step 105). The vendor can then respond to the certificate by providing the designated rebate value to the certificate sender. For example, the vendor may provide services or products or simply credit an account of the sender.

The certificate that is generated at data center 5 can be cryptographically secured using conventional cryptographic techniques so that the certificate can be validated as being authentic by the vendor (vendor verifies that data center 5 created the certificate and that the data contained therein has not been modified). The instant invention contemplates using any known cryptographic techniques that can be used to authenticate the party from which the certificate was sent and/or to verify that the certificate data has not been modified.

In addition to the above, the facsimile, postage meter, or computer that receives the certificate can be programmed to prevent the printing of multiple copies of the certificate. That is, once the certificate is printed, the electronically stored version is eliminated. This prevents the printing of fraudulent duplicate certificates. Furthermore, if unique cryptographic information is included in the certificate, duplicates can be detected by the vendor by keeping track of all certificates processed.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, as shown at step 101 of FIG. 4b, instead of sending the certificate electronically it can be printed and sent via the postal service. Additionally, while FIGS. 1–3 all show communication between the postage meter and data center as taking place over a telephone exchange, the instant invention contemplates communications between these apparatus over any conventional communications channels. Examples of such communications channels are any type of network environment or via the internet or an intranet.

Moreover, while the postage meter shown in the preferred embodiment is a conventional closed system postage meter having a dedicated printer, the instant invention is applicable to current personal computer (PC) postage metering systems as well. In these PC postage applications use is made of a general-purpose computer and a general-purpose printer to form part of the postage metering system in conjunction with a vault. In a PC meter version the vault is a physical device located with the personal computer. In a virtual meter system the PC has postage metering interface software but the actual vault is located at a remote postage data center. In both systems, a postage indicium is printed on the general-purpose printer and the inventive rebate concepts discussed above can be equally applied to these systems. The only difference is that in the virtual meter system the user vaults may be located at the data center where the postage refill activity takes place or at a separate data center in communication with the refill data center.

What is claimed is:

1. A method for generating a rebate in a postage meter resetting system, the method comprising the steps of:
   receiving a postage refill request at a postage data center to electronically add postage to a postage meter;
   determining at the postage data center a rebate value associated with the postage refill request; and
   sending the rebate value to a designated location,
   wherein the rebate value is based on the postage refill amount.

2. A method as recited in claim 1, further comprising sending the rebate value in the form of a check.

3. A method as recited, in claim 1, further comprising sending the rebate value as an electronic funds transfer to a designated account.

4. A method as recited in claim 1, further comprising sending the rebate value as a credit for posting at one of a credit card account and a postage line of credit database.

5. A method as recited in claim 1, further comprising sending the rebate value as a certificate that is redeemable upon presentment to a vendor.

6. A method as recited in claim 5, further comprising cryptographically securing the certificate in order to authenticate the source of the rebate and verify that the certificate has not been modified.

7. A method as recited in claim 5, further comprising sending the certificate in electronic form to one of a facsimile, a postage meter, and an e-mail address.

8. A method as recited in claim 5, wherein the certificate is redeemable for one of money, services, supplies, discounts, and postage.

9. A method as recited in claim 1, further comprising receiving with the postage refill request a user preference for sending the rebate value, the preference being selected at the time of the postage refill request from one of issuing a check, electronically transferring funds, crediting an account, electronically transferring postage, and issuing a certificate.

10. A data center for a postage meter resetting system, the data center comprising:
    a computer that receives a postage refill request to electronically add a postage refill amount to a postage meter;
    means for determining at the computer a rebate value associated with the postage refill request; and
    means for sending the rebate value to a designated location, wherein the determining means determines the rebate value based on the postage refill amount.

11. A data center as recited in claim 10, wherein the determining means determines the rebate value as a percentage of the postage refill amount.

12. A data center as recited in claim 10, wherein the sending means includes means for issuing the rebate value in the form of a check.

13. A data center as recited in claim 10, wherein the sending means includes means for an electronic funds transfer of the rebate value to a designated account.

14. A data center as recited in claim 10, wherein the sending means includes means for sending the rebate value as a credit for posting at one of a credit card account and a postage line of credit database.

15. A data center as recited in claim 10, wherein the sending means includes means for sending the rebate value in the form of a cryptographically secured electronic certificate to at least one of a facsimile, a postage meter and an e-mail address.

16. A method for generating a rebate in a postage meter resetting system, the method comprising the steps of:
    receiving a postage refill request at a postage data center to electronically add postage to a postage meter;
    determining at the postage data center a rebate value associated with the postage refill request; and
    receiving with the postage refill request a user preference for sending the rebate value, the preference being selected at the time of the postage refill request from one of issuing a check, electronically transferring funds, crediting an account, electronically transferring postage, and issuing a certificate.

17. A method as recited in claim 16, further comprising:
    sending the rebate value to a designated location as a certificate; and
    cryptographically securing the certificate in order to authenticate the source of the rebate and verify that the certificate has not been modified.

* * * * *